United States Patent [19]
Wiersing et al.

[11] Patent Number: 5,861,593
[45] Date of Patent: Jan. 19, 1999

[54] MODULAR SWITCH STALK ASSEMBLABLE IN DIFFERENT ORIENTATIONS TO PROVIDE DIFFERENT ROTATION FEATURES

[75] Inventors: Jeffrey K. Wiersing, Walled Lake; Owen D. Winkler, Westland, both of Mich.

[73] Assignee: UT Automotive Dearborn, Inc., Dearborn, Mich.

[21] Appl. No.: 899,630

[22] Filed: Jul. 24, 1997

[51] Int. Cl.⁶ .............................. H01H 9/00; H01H 3/16
[52] U.S. Cl. ...................... 200/61.54; 200/61.27
[58] Field of Search .................. 200/61.54, 61.27, 200/336, 564

[56] References Cited

U.S. PATENT DOCUMENTS

| | | | |
|---|---|---|---|
| 3,618,560 | 11/1971 | Aoki | 166/124.1 |
| 4,737,608 | 4/1988 | Jones | 200/564 |
| 4,849,585 | 7/1989 | Vidican et al. | |
| 5,003,132 | 3/1991 | Lagier | 200/4 |
| 5,701,660 | 12/1997 | Javery et al. | 29/622 |

*Primary Examiner*—Wynn Wood Coggins
*Assistant Examiner*—Michael J. Hayes
*Attorney, Agent, or Firm*—Howard & Howard

[57] ABSTRACT

A switch stalk includes a stalk lever comprising a knob mounted on a base portion. The knob is mountable on the base portion in one of a plurality of orientations. A different set of rotational stops are provided in each orientation in which the knob can be mounted on the base portion. Therefore, the knob is rotatable through a different displacement in each of the orientations in which it is mounted. Further, a different set of detents is provided in each orientation in which the knob is mounted on the base portion.

18 Claims, 2 Drawing Sheets

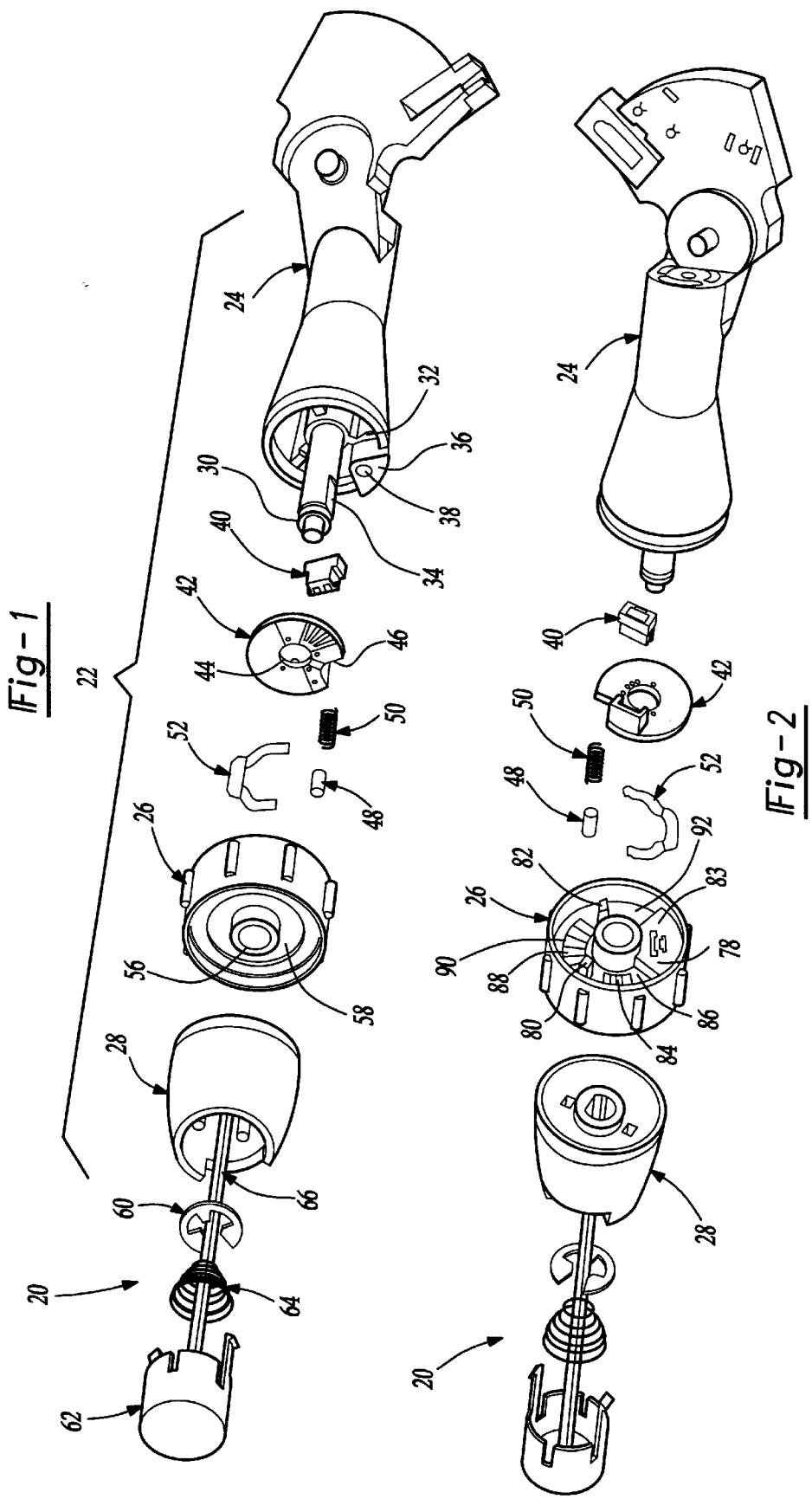

MODULAR SWITCH STALK ASSEMBLABLE IN DIFFERENT ORIENTATIONS TO PROVIDE DIFFERENT ROTATION FEATURES

BACKGROUND OF THE INVENTION

The present invention relates generally to a multifunction switch stalk, such as for use in a vehicle, and more particularly to a switch stalk which is assemblable in different configurations to provide different rotation features, such as rotational limits and detents.

Current multifunction switch stalks typically include a stalk lever comprising a base portion which is pivotally connected to a steering column. The stalk lever further includes one or more knobs rotatably mounted on the base portion to selectively activate a plurality of vehicle functions. The knob on the known switch stalk may provide any one of a plurality of rotation features. For example, the knob can be rotatable approximately 60° to a plurality of detent positions in order to provide a variable delay wiper switch. Alternatively, the knob can be rotatably approximately 30° between two positions to provide only two selected intermittent wiper delay intervals. Further, the knob may be non-rotatably mounted on a switch stalk which does not provide the intermittent wiper function.

In the known switch stalk, each of these different features requires a different set of hardware, including a different knob with different detents and different stops restricting the rotational displacement of the knob. As a result, a higher inventory must be maintained. Further, this increases tooling costs, as each configuration of the knob must be separately tooled.

SUMMARY OF THE INVENTION

The present invention provides a modular switch stalk assembly in which a single rotatable control knob can be assembled in one of a plurality of different orientations in order to provide different rotation features. In a first orientation, the knob permits a first rotational displacement and provides a first set of detents. In a second orientation rotatably displaced from the first orientation, the control knob permits a second rotational displacement, greater than the first rotational displacement and provides a second set of detents different than the first set of detents. In a third orientation, the control knob is non-rotatable relative to the stalk lever.

Generally, the control knob is mounted on an outer end of a base portion of the stalk lever. The outer end of the base portion includes a stop extending axially from the base portion. The inner end of the control knob includes a plurality of circumferentially spaced, radially extending walls forming a plurality of abutment surfaces. When the control knob is oriented such that the stop on the base portion is positioned between first and second abutment surfaces, a first rotational displacement of the knob relative to the base portion is permitted. When the control knob is mounted on the base portion in a second orientation, the stop is positioned between a third abutment surface and fourth abutment surface, thereby limiting the control knob to a second rotational displacement greater than the first rotational displacement. When the control knob is mounted in a third orientation relative to the base portion, the stop is snugly positioned between the fifth and sixth abutment surfaces, thereby preventing rotational displacement of the control knob relative to the base portion. A plunger extending axially from the outer end of the stop engages a different set of detents when the control knob is in each of the orientations.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is an exploded perspective view of the switch stalk according to the present invention;

FIG. 2 is the switch stalk of FIG. 1 from a different perspective;

DETAILED DESCRIPTION OF A PREFERRED EMBODIMENT

Figure 3:
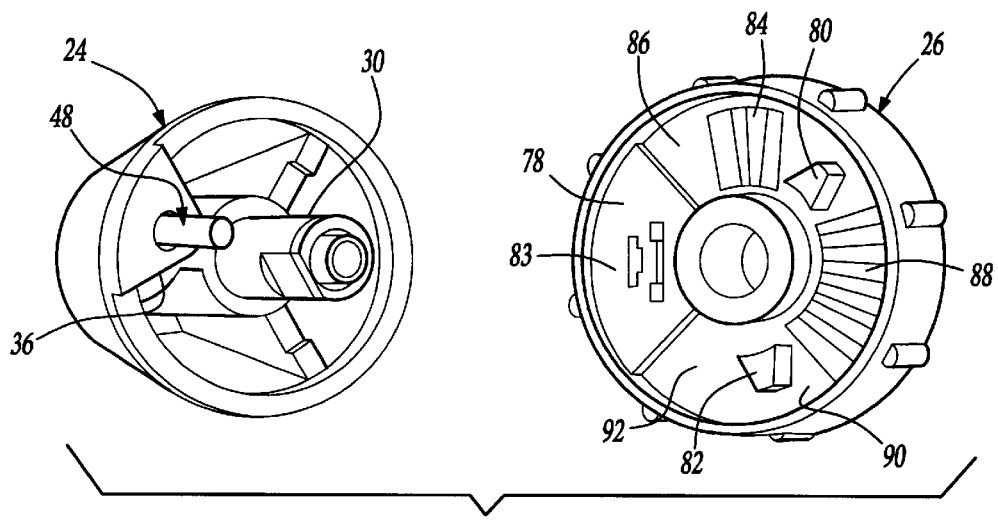
FIG. 3 is a partially exploded, perspective view of the control knob and base portion of FIG. 1 in a first orientation.

An exploded view of a perspective view of a switch stalk 20 according to the present invention is shown in FIG. 1. Switch stalk 20 generally comprises a stalk lever 22 comprising a base portion 24, control knob 26 and knob cap 28. As is known, the stalk lever 22 is movable pivotally in order to provide a plurality of vehicle functions. The base portion 24 includes a shaft 30 extending axially outwardly from an outer end 32. An outer end of the shaft 30 includes a key 34. The outer end 32 of the base portion 24 further includes a stop 36 extending axially outwardly, parallel to shaft 30 and radially displaced from shaft 30. The stop 36 includes a recess 38 extending axially into the stop 36.

The switch stalk 20 further includes a wire harness 40 for connecting wires (not shown) to a PCB 42. The PCB 42 includes an aperture 44 through which the shaft 30 is inserted and a notch 46 for accommodating the stop 36. A plunger 48 and spring 50 are disposed within the recess 38 in the stop 36. The spring 50 biases the plunger 48 axially outwardly from the stop 36. A metal contact 52 is mounted to the control knob 26 for selectively contacting electrical contacts on the PCB 42. The control knob 26 includes a central aperture 56 extending axially through the control knob 26 for receiving the shaft 30.

The knob cap 28 is mounted on an axial outer end 58 of the control knob 26 and secured to the shaft 30 by a clip 60. The switch stalk 20 further includes an axially compressible button 62 biased axially outwardly by a spring 64. The button 62 engages a shaft 66 which is insertable into the shaft 30 to contact a switch within base portion 24.

As can be seen in FIG. 2, the control knob 26 includes a first radial wall 78, a second radial wall 80, and a third radial wall 82, all circumferentially spaced and extending axially inwardly from an axial inner end 83 of knob 26. A first set of detents 84 are formed in a first interval 86 of the surface between the first wall 78 and the second wall 80. A second set of detents 88 is preferably formed in a second interval 90 of the surface between the second wall 80 and the third wall 82. A third interval 92 without detents is defined between the third wall 82 and the first wall 78.

By assembling the control knob 26 in one of a plurality of rotational orientations, the stop 36 of the base portion 24 will be positioned in one of the intervals 86, 90, 92, thereby providing a different rotational displacement limitation and different detents to the plunger 48. Preferably, a different PCB 42 (or no PCB 42) would be utilized in each orientation so that the metal contacts 52 contacts an electrical contact on the PCB 42 at each detent position.

For example, in the orientation shown in FIG. 3, the stop 36 will be positioned in the second interval 90 between second wall 80 and third wall 82 thereby permitting approximately 60° rotation of the control knob 26 relative to the base portion 24 and providing the second set of detents 88 to the plunger 48. This orientation would be utilized for a variable intermittent wiper adjustment.

Figure 4:
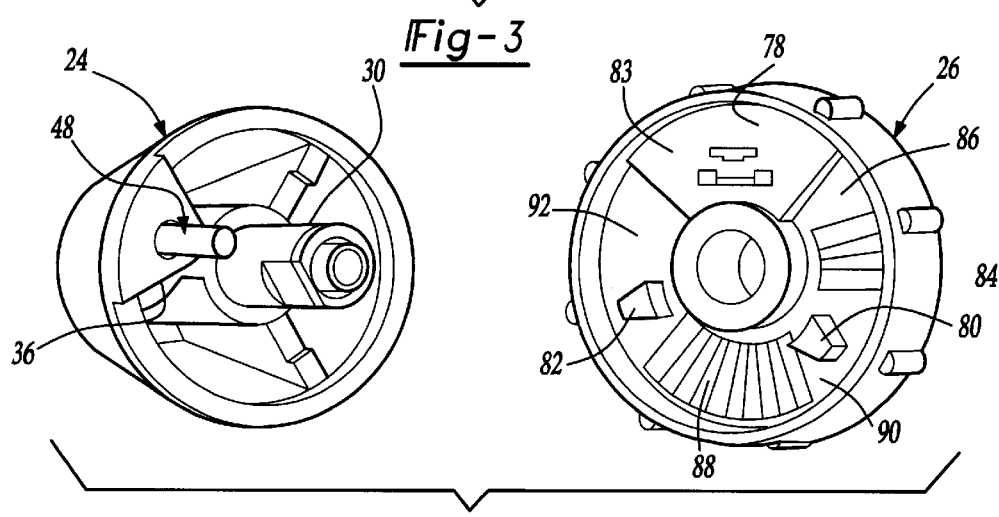
FIG. 4 is a partially exploded, perspective view of the control knob and base portion of FIG. 1 in a second orientation.

In the orientation shown in FIG. 4, the stop 36 will be positioned in the first interval 86 between the first wall 78 and the second wall 80. The plunger 48 will engage the first set of detents 84. The first wall 78, second wall 80 and stop 36 will limit the rotational displacement of the control knob 26 relative to the base portion 24 to approximately 30°. This orientation would be utilized, for example, for a two position delay wiper function.

Figure 5:
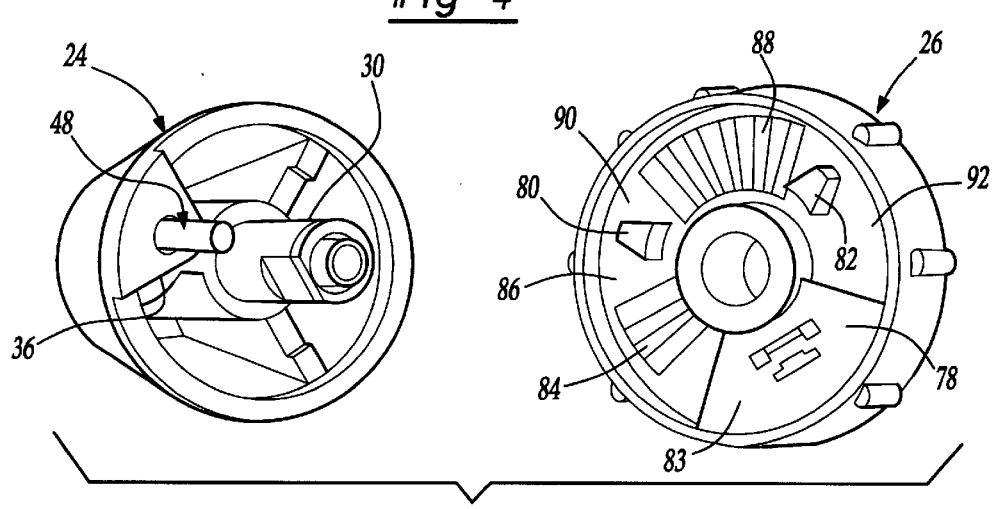
FIG. 5 is a partially exploded, perspective view of the control knob and base portion of FIG. 1 in a third orientation.

In the orientation shown in FIG. 5, the stop 36 will be positioned between the third wall 82 and first wall 78 in the third interval 92. The stop 36 fits tightly within the third interval 92, thereby prohibiting rotational displacement of the control knob 26 relative to the base portion 24. This orientation would be utilized for a single fixed delay wiper or a no delay wiper.

In the switch stalk 20 of the present invention, a single control knob 26 can be tooled and maintained in inventory and yet provide a plurality of rotational and detent features which can be selected during assembly. As a result, tooling costs and inventory can be reduced. Further, as an alternative, the axial outer end 58 of control knob 26 could also include a plurality of radial walls similar to walls 78, 80, 82. In such a manner, additional intervals permitting different rotational displacements of control knob 26 or different detent features could be provided. Such features could be selected by rotating the control knob 26 about an axis perpendicular to the axis through the aperture 56, thereby switching the outer end 58 and inner end 83. It should be apparent that the stop 36 could alternatively be mounted on the control knob 26 with the radial walls 78, 80, 82 mounted on the outer end 32 of the base portion 24. Further, it should be apparent that stalk lever 22 components other than the base portion 24 which are mounted adjacent the knob 26 could provide the stop 36 (or the radial walls 78, 80, 82).

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A stalk switch assembly comprising:
    a stalk lever having an axis;
    a knob mountable on said stalk lever, said knob being mountable on said stalk lever in a first orientation and being mountable in a second orientation rotationally displaced from said first orientation, said knob being rotatable a first rotational displacement when mounted in said first orientation and a second rotational displacement greater than said first displacement when mounted in said second orientation.

2. The stalk switch assembly of claim 1 further comprising:
    a plunger mounted on one of said stalk lever and said knob and biased toward the other of said stalk lever and said knob, the other including a first surface contacting said plunger when said knob is mounted in said first orientation and a second surface contacting said plunger when said knob is mounted in said second orientation.

3. The stalk switch assembly of claim 2 wherein said first surface includes a plurality of detents and said second surface includes a plurality of detents, the plurality of detents on said second surface exceeding the number of detents on said first surface.

4. The stalk switch assembly of claim 1 wherein one of said said stalk lever and said knob includes a stop and the other includes a first abutment surface, said first abutment surface limiting the rotational displacement of said knob by contacting said stop when said knob is mounted in said first orientation, said stop not limiting the rotational displacement of said knob by contacting said first abutment surface when said knob is mounted in a second orientation rotationally displaced from said first orientation.

5. The stalk switch assembly of claim 4 wherein said first orientation is rotationally displaced about said axis from said second orientation.

6. The stalk switch assembly of claim 4 wherein the other further includes second, third, and fourth abutment surfaces circumferentially spaced about said axis, said stop positioned between said first and second surfaces when said knob is mounted in said first orientation, said stop positioned between said third and fourth surfaces when said knob is mounted in said second orientation.

7. The stalk switch assembly of claim 4 wherein said stalk lever includes said stop.

8. The stalk switch assembly of claim 4 further including a plunger mounted on said stop and biased toward said other of said stalk lever and said knob, the other including a first surface contacting said plunger when said knob is mounted in said first orientation and a second surface contacting said plunger when said knob is mounted in said second orientation.

9. A method for assembling a switch including the steps of:
    forming an axially-extending stop in a lever having an axis; biasing a plunger outwardly from said stop;
    rotationally orienting a knob having an axially-extending first wall relative to said lever to selectively place said stop in either a first rotational position relative to said first wall when said knob is in a first orientation or a second rotational position relative to said first wall when said knob is in a second orientation, said knob being mountable on said lever in said first orientation and said second orientation;
    mounting said knob on said lever in one of first and second orientations, said stop and said first wall limiting rotational displacement of said knob relative to said lever.

10. The method of claim 9 further including the steps of:
    forming an axially-extending second wall in said knob; and
    positioning said stop between said first wall and said second wall.

11. The method of claim 9 further including the steps of:
    forming a plurality of detents on one of said stalk lever and said knob;
    mounting a plunger in the other of said stalk lever and said knob;
    said plunger contacting said plurality of detents when said knob is mounted in said first orientation, said plunger prevented from contacting said plurality of detents by said stop and said wall when said knob is mounted in said second orientation.

12. A knob having an aperture for rotatably mounting on a switch stalk, said knob being mountable in a first orientation and a second orientation rotatably displaced from said first orientation, said knob further including a plurality of walls circumferentially spaced and extending axially from a first axial end, said plurality of walls defining a first interval and a second interval said first interval including a first set of detents and said second interval including a second set of detents having a different configuration from said first set of detents.

13. The knob of claim 12 wherein said first interval is larger than said second interval.

14. The stalk switch assembly of claim 1 further comprising:

a plunger mounted on one of said stalk lever and said knob and axially biased toward an axial surface of the other of said stalk lever and said knob, said axial surface including a first interval having a plurality of first detents and a second interval having a plurality of second detents exceeding said plurality of first detents in number, said plunger engaging said first plurality of detents when said knob is mounted in said first orientation, said plunger engaging said second plurality of detents when said knob is mounted in said second orientation.

15. The stalk switch assembly of claim 1 further comprising:

an axially-extending stop mounted on one of said stalk lever and said knob, the other of said stalk lever and said knob having a plurality of axially-extending walls defining a first interval and a second interval greater than said first interval, said stop positioned in said first interval when said knob is mounted in said first orientation, said stop positioned in said second interval when said knob is mounted in said second orientation, said plurality of walls limiting rotational displacement of said knob relative to said stalk lever when said knob is in said first orientation and said second orientation.

16. The stalk switch assembly of claim 15 further comprising:

a plunger axially biased toward and engaging a first axial surface having a plurality of first detents when said knob is mounted in said first orientation, said plunger axially biased toward and engaging a second axial surface having a plurality of second detents when said knob is mounted in said second orientation, said first plurality of detents differing from said second plurality of detents in number.

17. The stalk switch assembly of claim 16 wherein said first axial surface and said second axial surface are defined between said axially-extending walls.

18. The stalk switch assembly of claim 17 wherein said plunger extends axially from said stop.

* * * * *